US012812519B2

(12) United States Patent
Lee et al.

(10) Patent No.: US 12,812,519 B2
(45) Date of Patent: Nov. 24, 2026

(54) METHOD AND DEVICE FOR SIMULTANEOUSLY USING NETWORK SLICES

(71) Applicant: Samsung Electronics Co., Ltd., Gyeonggi-do (KR)

(72) Inventors: Hoyeon Lee, Gyeonggi-do (KR); Sangsoo Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 459 days.

(21) Appl. No.: 18/018,382

(22) PCT Filed: Jul. 29, 2021

(86) PCT No.: PCT/KR2021/009879
§ 371 (c)(1),
(2) Date: Jan. 27, 2023

(87) PCT Pub. No.: WO2022/025666
PCT Pub. Date: Feb. 3, 2022

(65) Prior Publication Data
US 2023/0300731 A1 Sep. 21, 2023

(30) Foreign Application Priority Data
Jul. 30, 2020 (KR) ........................ 10-2020-0095181

(51) Int. Cl.
*H04W 48/18* (2009.01)
*H04W 60/00* (2009.01)
*H04W 92/02* (2009.01)

(52) U.S. Cl.
CPC ......... *H04W 48/18* (2013.01); *H04W 60/005* (2013.01); *H04W 92/02* (2013.01)

(58) Field of Classification Search
CPC ..... H04W 24/02; H04W 60/00; H04W 84/04; H04W 60/04; H04W 36/0061; H04W 36/08
See application file for complete search history.

(56) References Cited

U.S. PATENT DOCUMENTS 10,595,268 B2 3/2020 Lee et al.
10,764,951 B2 9/2020 Park et al.
(Continued)

FOREIGN PATENT DOCUMENTS

AU 2017435947 5/2020
CN 109246813 1/2019
(Continued)

OTHER PUBLICATIONS

PCT/ISA/210 Search Report issued on PCT/KR2021/009879, Oct. 28, 2021 pp. 5.
(Continued)

*Primary Examiner* — Iqbal Zaidi
(74) *Attorney, Agent, or Firm* — The Farrell Law Firm, P.C.

(57) ABSTRACT

The present disclosure relates to a communication technique for merging IoT technology with a 5G communication system for supporting a data transmission rate higher than that of a 4G system, and a system therefor. The present disclosure can be applied to intelligent services (for example, smart homes, smart buildings, smart cities, smart cars or connected cars, healthcare, digital education, retail businesses, security- and safety-related services, and the like) on the basis of 5G communication technology and IoT-related technology. The present disclosure provides a method and a device for efficiently providing and managing a network slice for a terminal service.

10 Claims, 8 Drawing Sheets

(56) References Cited

U.S. PATENT DOCUMENTS

| | | | | |
|---|---|---|---|---|
| 10,791,508 | B2 | 9/2020 | Park et al. | |
| 11,026,128 | B2 | 6/2021 | Faccin et al. | |
| 11,159,933 | B2 | 10/2021 | Zong et al. | |
| 2019/0124561 | A1 | 4/2019 | Faccin et al. | |
| 2019/0141606 | A1 | 5/2019 | Qiao et al. | |
| 2019/0297148 | A1* | 9/2019 | Zong | H04L 67/146 |
| 2020/0008139 | A1 | 1/2020 | Lai et al. | |
| 2020/0053643 | A1 | 2/2020 | Lee et al. | |
| 2020/0077327 | A1 | 3/2020 | Duan et al. | |
| 2020/0107250 | A1 | 4/2020 | So | |
| 2020/0236528 | A1 | 7/2020 | Lee et al. | |
| 2021/0250854 | A1 | 8/2021 | Olvera-Hernandez et al. | |
| 2023/0262580 | A1* | 8/2023 | Ishii | H04W 36/08 455/436 |
| 2025/0113216 | A1* | 4/2025 | Foti | H04W 60/00 |

FOREIGN PATENT DOCUMENTS

| | | |
|---|---|---|
| CN | 110603830 | 12/2019 |
| CN | 111226472 | 6/2020 |
| CN | 111247771 | 6/2020 |
| EP | 3 557 906 | 10/2019 |
| KR | 10-2019-0082897 | 7/2019 |
| KR | 10-2020-0003195 | 1/2020 |
| KR | 10-2020-0068668 | 6/2020 |
| WO | WO 2019/245921 | 12/2019 |
| WO | WO 2020/074573 | 4/2020 |
| WO | WO 2020/080044 | 4/2020 |

OTHER PUBLICATIONS

PCT/ISA/237 Written Opinion issued on PCT/KR2021/009879, Oct. 28, 2021 pp. 4.

3GPP TR 23.740 V16.0.0, 3GPP, 3rd Generation Partnership Project; Technical Specification Group Services and System Aspects; Study on Enhancement of Network Slicing (Release 16), Dec. 2018, 20 pages.

European Search Report dated Nov. 13, 2023 issued in counterpart application No. 21851581.5-1216, 12 pages.

3GPP TR 23.501 V16.5.0, (Jul. 2020), pp. 441.

Japanese Office Action dated Apr. 30, 2025 issued in counterpart application No. 2023-506133, 7 pages.

EP Communication Report dated Sep. 26, 2025 issued in counterpart application No. 21851581.5-1206, 8 pages.

Samsung, "Correction on EPS Interworking Procedure", S2-2003100, 3GPP TSG-SA2 Meeting #138-E, Apr. 20-23, 2020, 3 pages.

Samsung, "Procedures to Support Coexistence Rules", S2-177174, SA WG2 Meeting #123, Oct. 23-27, 2017, 10 pages.

Chinese Office Action dated Mar. 24, 2026 issued in counterpart application No. 202180058469.9, 29 pages.

Chinese Notice of Allowance dated Aug. 31, 2026 issued in counterpart application No. 202180058469.9, 7 pages.

Korean Office Action dated Sep. 30, 2026 issued in counterpart application No. 10-2020-0095181, 9 pages.

* cited by examiner

METHOD AND DEVICE FOR SIMULTANEOUSLY USING NETWORK SLICES

PRIORITY

This application is a National Phase Entry of PCT International Application No. PCT/KR2021/009879 which was filed on Jul. 29, 2021, and claims priority to Korean Patent Application No. 10-2020-0095181, which was filed on Jul. 30, 2020, the entire content of each of which is incorporated herein by reference.

TECHNICAL FIELD

The disclosure relates generally to a wireless communication system, and more particularly, to a device and method for providing network slicing in a wireless communication system or a mobile communication system.

BACKGROUND ART

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post long term evolution (LTE) system. The 5G communication system defined by a 3rd generation partnership project (3GPP) is referred to as a new radio (NR) system.

In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna were discussed for the 5G communication system and were applied to an NR system.

Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation are being developed.

Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

Innovation of Internet from a human-centered connection network in which a human generates and consumes information to an Internet of Things (IoT) network that gives and receives and processes information to and from distributed constituent elements such as things has occurred.

Internet of everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network are being made. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

With the recent development of communication systems, various studies are being conducted on methods for simultaneously providing different network slicing (or network slices).

DISCLOSURE OF INVENTION

Technical Problem

Based on the above discussion, the disclosure provides a method and device for interworking a 5G network system structure (e.g., an evolved packet core (EPC) between a 5G core (5GC) and an evolved packet system (EPS) network system) that provides a network slice function in a wireless communication system.

Solution to Problem

According to an embodiment of the disclosure, a method performed by an access and mobility function (AMF) entity may include receiving, from a terminal, a registration request message including first information on a requested network slice, wherein the first information is to indicate at least one network slice related to a packet data network (PDN) connection established by the terminal in a first network; determining, by the terminal, an allowed network slice available in a second network based on the first information; and transmitting, to the terminal, a registration accept message including second information indicating the allowed network slice.

According to an embodiment of the disclosure, a method performed by a terminal may include transmitting a registration request message including first information on a requested network slice to an access and mobility function (AMF) entity, wherein the first information is to indicate at least one network slice related to a packet data network (PDN) connection established by the terminal in a first network; and receiving, from the AMF, a registration accept message including second information available by the terminal in a second network and indicating an allowed network slice determined based on the first information.

According to an embodiment of the disclosure, an access and mobility function (AMF) entity may include a transceiver configured to transmit and receive signals; and a controller, wherein the controller may be configured to receive, from a terminal, a registration request message including first information on a requested network slice, wherein the first information is to indicate at least one network slice related to a packet data network (PDN) connection established by the terminal in a first network, to determine, by the terminal, an allowed network slice available in a second network based on the first information, and to transmit, to the terminal, a registration accept message including second information indicating the allowed network slice.

According to an embodiment of the disclosure, a terminal may include a transceiver configured to transmit and receive signals; and a controller, wherein the controller may be configured to transmit a registration request message including first information on a requested network slice to an access and mobility function (AMF) entity, wherein the first information is to indicate at least one network slice related to a packet data network (PDN) connection established by the terminal in a first network and to receive, from the AMF, a registration accept message including second information available by the terminal in a second network and indicating an allowed network slice determined based on the first information.

Advantageous Effects of Invention

According to a device and method according to various embodiments of the disclosure, by providing an interworking method between a 5G network system structure providing a network slice function and an EPS network system, a service can be effectively provided in a mobile communication system.

Effects obtainable in the disclosure are not limited to the above-mentioned effects, and other effects not mentioned will be clearly understood by those of ordinary skill in the art to which the disclosure belongs from the description below.

MODE FOR THE INVENTION

Figure 1:
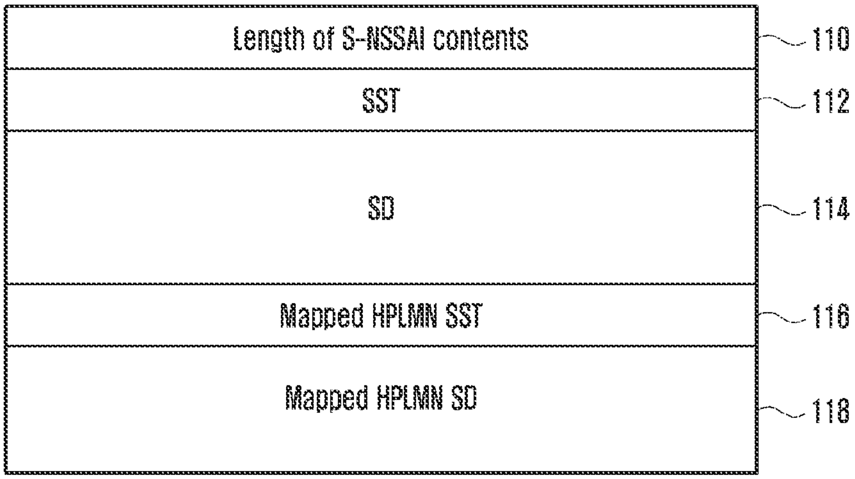
FIG. 1 is a block diagram illustrating a constitution of a network slice IE related to an embodiment of the disclosure.

Hereinafter, preferred embodiments of the disclosure will be described in detail with reference to the accompanying drawings. In this case, it should be noted that in the accompanying drawings, the same components are denoted by the same reference numerals if possible. Further, detailed descriptions of well-known functions and constitutions that may obscure the gist of the disclosure will be omitted.

In describing embodiments in this specification, descriptions of technical contents that are well known in the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only embodiments of the disclosure enable the disclosure to be complete, and are provided to fully inform the scope of the disclosure to those of ordinary skill in the art to which the disclosure belongs, and the disclosure is only defined by the scope of the claims. Like reference numerals refer to like components throughout the specification.

In this case, it will be understood that each block of message flow diagrams and combinations of the message flow diagrams may be performed by computer program instructions. Because these computer program instructions may be mounted in a processor of a general purpose computer, special purpose computer, or other programmable data processing equipment, the instructions performed by a processor of a computer or other programmable data processing equipment generate a means that performs functions described in the message flow diagram block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the message flow diagram block(s). Because the computer program instructions may be mounted on a computer or other programmable data processing equipment, a series of operational steps are performed on the computer or other programmable data processing equipment to generate a computer-executed process; thus, instructions for performing a computer or other programmable data processing equipment may provide steps for performing functions described in the message flow diagram block(s).

Further, each block may represent a module, a segment, or a portion of a code including one or more executable instructions for executing a specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, the term '-unit' used in this embodiment means software or hardware components such as a field programmable gate array (FPGA) or an application specific integrated circuit (ASIC), and '-unit' performs certain roles. However, '-unit' is not limited to software or hardware.

'-unit' may be formed to reside in an addressable storage medium or may be formed to reproduce one or more processors. Therefore, as an example, '-unit' includes components such as software components, object-oriented software components, class components, and task components, processes, functions, properties, procedures, subroutines, segments of program code, drivers, firmware, microcode, circuit, data, databases, data structures, tables, arrays, and variables. Functions provided in the components and '-units' may be combined into a smaller number of components and '-units' or may be further separated into additional components and '-units'. Further, components and '-units' may be implemented to reproduce one or more CPUs in a device or secure multimedia card.

Hereinafter, the disclosure discloses a device and method for providing interworking of a network slice (or network slicing) in a wireless communication system. Specifically, a technology for interworking between a 5G network system structure that provides a network slice function in a wireless communication system and an EPS network system will be described through the disclosure.

A term indicating a signal, a term indicating a channel, a term indicating control information, a term indicating a network entity or a network function (NF), and a term indicating a component of the device, which are used in the following description are exemplified for convenience of description. Accordingly, the disclosure is not limited to the terms described below, and other terms having equivalent technical meanings may be used.

Further, although the disclosure describes various embodiments using terms used in some communication standards (e.g., 3rd generation partnership project (3GPP)), this is only an example for description. Various embodiments of the disclosure may be easily modified and applied to other communication systems.

The 3GPP standard standardized the 5G network system architecture and procedures. Mobile communication operators may provide various services in the 5G network. In order to provide each service, a mobile communication operator needs to satisfy different service requirements (e.g., delay time, communication range, data rate, bandwidth, and reliability) for each service. To this end, the mobile communication operator may constitute a network slice and allocate network resources appropriate for a specific service for each network slice or for each set of network slices.

The network resource may mean an NF, a logical resource provided by the NF, or radio resource allocation of a base station.

For example, a mobile communication operator may constitute a network slice A so as to provide a mobile broadband service, constitute a network slice B so as to provide a vehicle communication service, and constitute a network slice C so as to provide an IoT service. That is, in this way, in the 5G network, the corresponding service may be efficiently provided to a terminal through a network slice specialized for characteristics of each service.

FIG. 1 is a block diagram illustrating a constitution of a network slice IE related to an embodiment of the disclosure.

Single-network slice selection assistance information (S-NSSAI) defined by a 3GPP may be used as a delimiter for classifying network slices. FIG. 1 illustrates an example of such an S-NSSAI information element (IE) constitution. One S-NSSAI may include at least one of a slice/service type (SST) 116 used in a home public land mobile network (HPLMN), a slice differentiator (SD) 118 used in the HPLMN, an SST 112 used in a serving PLMN, or an SD 114 used in the serving PLMN. Further, the S-NSSAI IE may further include a field 110 indicating a length of a content included in the S-NSSAI IE.

In a non-roaming situation, the SST 112 used in the serving PLMN may be the same as the SST 116 used in the HPLMN, and the SD 114 used in the serving PLMN may be the same as the SD 118 used in the HPLMN.

In a roaming situation, the SST 112 used in the serving PLMN may be an SST used in a visited PLMN (VPLMN), and the SD 114 used in the serving PLMN may be an SD used in the VPLMN. Each SST and SD value constituting one S-NSSAI may or may not have a value according to the situation.

Network slice selection assistance information (NSSAI) may be composed of one or more S-NSSAIs. Examples of NSSAI may include configured NSSAI stored in the terminal, requested NSSAI requested by the terminal, allowed NSSAI determined by an NF (e.g., access and mobility function (AMF), session management function (SMF), user plane function (UPF), policy control function (PCF), user data management (UDM), user data repository (UDR), and network slice selection function (NSSF)) of a 5G core network and allowed to be used by the terminal, and subscribed NSSAI to which the terminal is subscribed, but this is only an example, and the example of NSSAI is not limited to the above description.

A mobile communication operator may operate together a 5G network and an EPS network (or referred to as an LTE-based network or a 4G network). The mobile communication terminal may access the 5G network to use a service, and then move to the EPS network. Alternatively, the mobile communication terminal may access the EPS network to use the service and then move to the 5G network. This may be referred to as 5G core (5GC)-EPC interworking, 5G system (5GS)-EPS interworking, or 4G-5G interworking.

The disclosure proposes an example of interworking (i.e., 5GS-EPS interworking) between a 5G network system structure providing a network slice function and an EPS network system or a 5GC-EPC interworking method.

Further, the disclosure defines a network operation and terminal operation that enable a terminal that establishes a session connection in the EPS and uses a communication service to continuously use the service even if the terminal moves to a 5GS.

Figure 2:
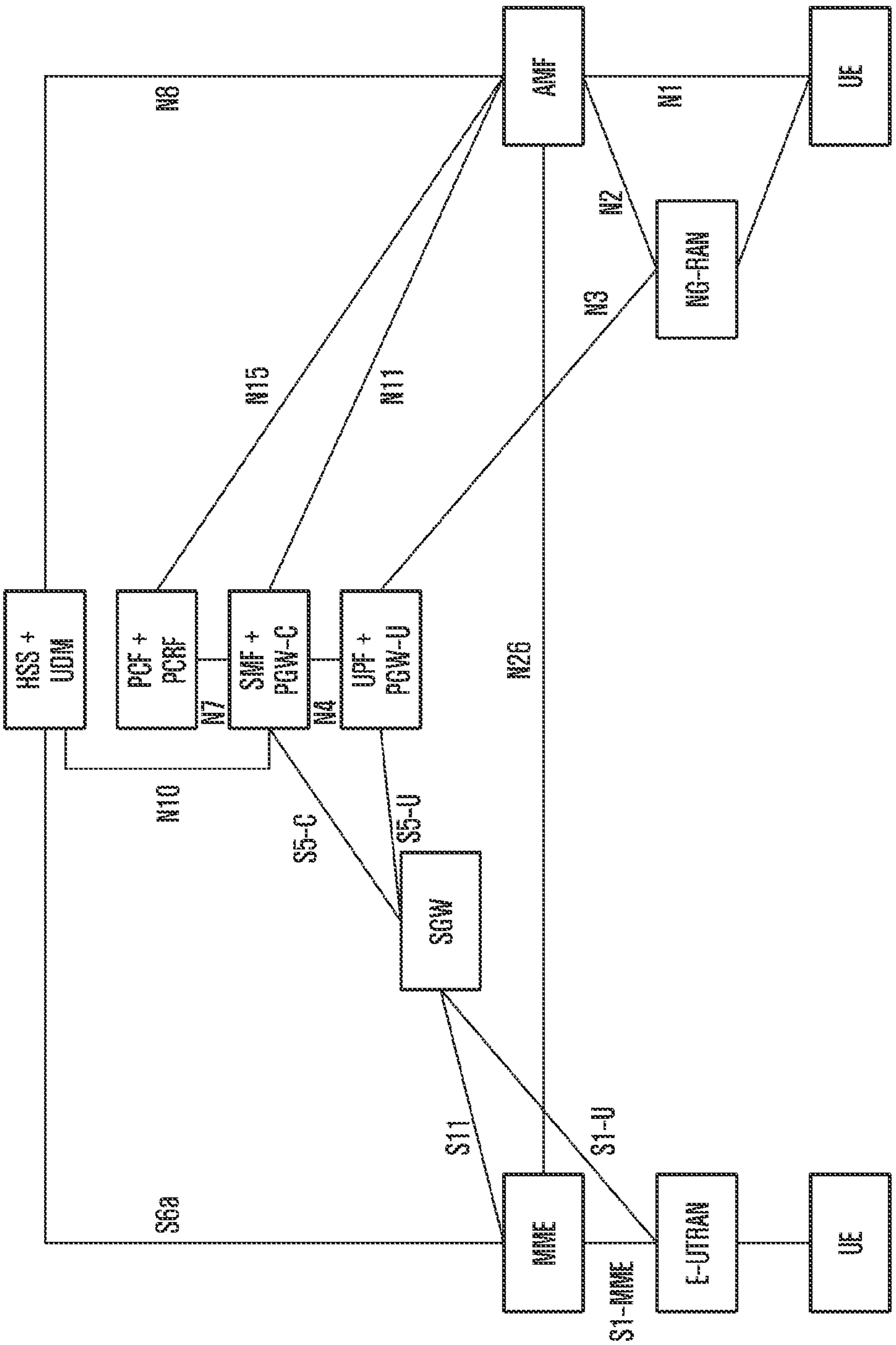
FIG. 2 is a diagram illustrating a structure of network slice interworking related to an embodiment of the disclosure.

FIG. 2 is a diagram illustrating a structure of network slice interworking related to an embodiment of the disclosure.

FIG. 2 illustrates an interworking structure of a 5GS and an EPS in a non-roaming situation. The 5GS may be composed of a new radio (NR) base station (radio access node (NG-RAN), next generation node B (gNB)), AMF, SMF, UPF, PCF, NSSF, UDM, and UDR. The EPS may be composed of an E-UTRA base station (evolved universal mobile telecommunications system (E-UTRAN (evolved UMTS) terrestrial radio access network), evolved node B (eNB)), mobility management entity (MME), serving gateway (SGW), packet data network gateway (PGW), PGW-U (user plane), PGW-C (control plane), policy and charging rule function (PCRF), and home subscriber server (HSS).

According to an embodiment, the AMF and the MME are network functions (NF) that manage radio network access and mobility for the UE. The SMF, SGW, and PGW are NFs that manage a session for the UE, and session information includes quality of service (QoS) information, charging information, and packet processing information. The UPF and the PGW are NFs that process user traffic (e.g., user plane traffic), and are controlled by the SMF and the SGW.

The PCF and the PCRF are NFs that manage an operator policy and/or a PLMN policy for providing a service in a wireless communication system. In addition, the PCF may be divided into a PCF in charge of an access and mobility (AM) policy and a UE policy, and a PCF in charge of a session management (SM) policy. The PCF in charge of the AM/UE policy and the PCF in charge of the SM policy may be logically or physically separated NFs or logically and physically one NF. The UDM and the HSS are NFs that store and manage UE subscription information. The UDR is an NF or database (DB) that stores and manages data. The UDR may store subscription information of the UE and provide subscription information of the UE to the UDM. Further, the UDR may store operator policy information and provide operator policy information to the PCF. The NSSF may be an NF that performs a function of selecting network slice instances serving the UE or determining NSSAI.

The UDM of the 5GS and the HSS of the EPS may be composed of one combo node (referred to as UDM+HSS). The SMF of the 5GS and the PGW-C of the EPS may be composed of one combo node (referred to as SMF+PGW-C). A UDM+HSS node may store subscriber information of the UE. The UPF of the 5GS and the PGW-U of the EPS may be composed of one combo node (referred to as UPF+PGW-C). The UE may access the MME of the EPS through the E-UTRA base station to use an EPS network service. Further, the UE may access the AMF of the 5GS through the NR base station to use a 5GS network service.

In this way, one NF or network entity may simultaneously support different network systems, and such an NF, network node, or network entity may be referred to as the above-described combo node, combo NF, combined node, integrated NF, and interworking node, interworking NF, and the like. Further, for convenience of illustration and description, NFs that simultaneously support different network systems may be indicated using a "+" symbol or a "/" symbol. For example, when the SMF and the PGW-C are composed of one combo node, they may be expressed as PGW-C/SMF, PGW-C+SMF, SMF/PGW-C, or SMF+PGW-C. In displaying the combo node, the order that connects two names has no effect on a function or role of the combo node.

A network slice means a logical network that provides a specific network capability and a network characteristic. A mobile communication operator may operate one or more network slices. For example, the mobile communication operator may support S-NSSAI A, S-NSSAI B, and S-NSSAI C. Further, the mobile communication operator may define a concept of simultaneous use of the network slice supported by a mobile communication operator based on at least one of a mobile communication operator policy, a service level agreement (SLA) with a third party service provider, a characteristic of the network slice, a service supported by the network slice, network deployment, or UE subscription information. For example, a mobile communication operator may define that S-NSSAI A and S-NSSAI C is available simultaneously, but that S-NSSAI A and S-NSSAI B are unavailable simultaneously. Alternatively, for example, the mobile communication operator may define that S-NSSAI A cannot be used together with any other network slice. Alternatively, for example, the mobile communication operator may define that S-NSSAI A may be used together with all network slices. Alternatively, for example, a mobile communication operator may define that S-NSSAI with the same SST may be used together. Alternatively, for example, a mobile communication operator may define that S-NSSAI with the same SD may be used together. For description of the disclosure, the operator policy defining simultaneous usability of the above-described network slice is referred to as a simultaneous use of the network slice (SUNS) policy or rule or SUNS information. The SUNS information may include group information in which the S-NSSAI and the S-NSSAIs is associated. One or more S-NSSAI associated with the same group may be used together simultaneously. For example, one or more S-NSSAIs associated with the same group may be simultaneously included in allowed NSSAI. SUNS information may be included in UE subscription information.

An NF according to an embodiment of the disclosure may support at least one of the following functions in order to provide simultaneous usability of network slices. One NF may support all of the following functions or multiple NFs may be distributed to support the following functions.

- An SUNS policy may be configured to one or more specific NFs. Alternatively, the NF may receive a SUNS policy from another NF.
- Any NF may store and manage network slice information (e.g., S-NSSAI) associated with a session (protocol data unit (PDU) session or packet data network (PDN) connection) established by the UE.
- Any NF may determine a network slice (e.g., S-NSSAI) of the session (PDU session or PDN connection) requested by the UE. In this case, the NF may determine a network slice (e.g., S-NSSAI) based on at least one of UE subscription information, UE request information (e.g., APN), network slice information (e.g., S-NSSAI) associated with another session established by the UE, or a SUNS policy.
- Any NF may transmit network slice information (e.g., S-NSSAI) determined by a specific NF including itself to another NF (e.g., SMF+PGW-C).

In the following description, proposed embodiments will be described on the assumption that some or all of the above-described various functions are supported.

Figure 3:
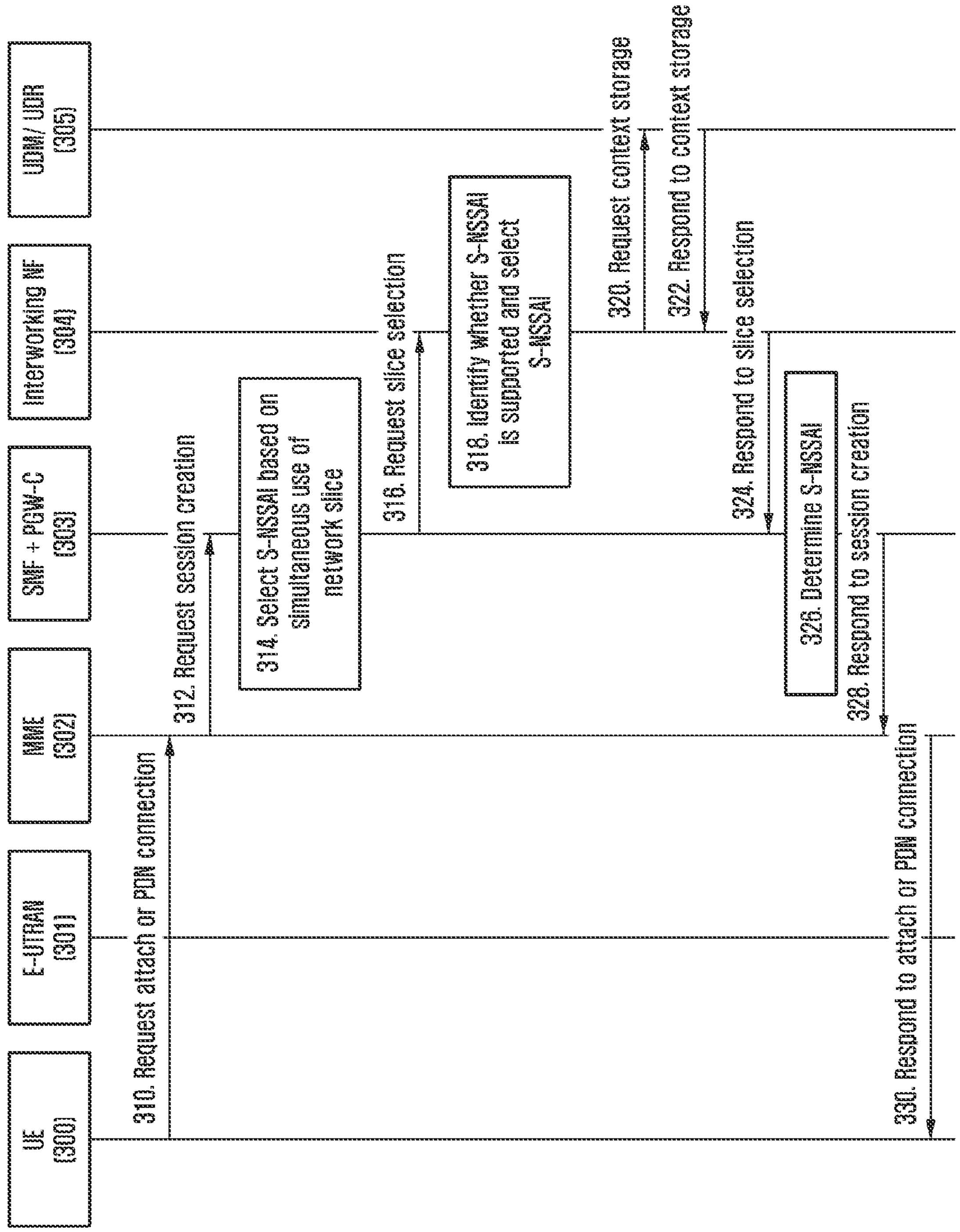
FIG. 3 is a message flow diagram illustrating a network slice selection method according to an embodiment of the disclosure.

FIG. 3 is a diagram illustrating a network slice selection method according to an embodiment of the disclosure.

FIG. 3 illustrates a session connection procedure in an EPC according to an embodiment of the disclosure.

FIG. 3 illustrates an NF operation according to an embodiment of the disclosure for providing simultaneous usability of a network slice during a session connection procedure.

With reference to FIG. 3, a UE 300 may access an MME 302 of the EPS through an E-UTRA base station (E-UTRAN or eNB) 301 to establish a PDN connection and use an EPS network service.

In step 310, after the UE 300 accesses a 4G wireless network (E-UTRAN) 301, in the case that the UE 300 is in an attach process for receiving a 4G service, or has been already registered in a 4G service, the UE 300 performs a process for creating a PDN connection. The UE 300 may merge and perform an operation for establishing a PDN connection during the attach process. The UE 300 may include desired access point name (APN) information in a non-access stratum (NAS) request message sending to the MME 302 in order to classify a service to be a target of session creation. Further, the UE 300 may include information (capability indication) indicating whether the UE supports a simultaneous use function of the network slice in the NAS request message sending to the MME 302.

In step 312, the MME 302 performs a process for creating a session according to information received from the UE 300. The MME 302 may select a GW (e.g., SGW, PGW) to process the session in consideration of other parameters and the APN received from the UE, and the MME 302 may transmit a request message for session creation to an SMF+PGW-C (for convenience of description, hereinafter, referred to as an SMF) 303, and such a request message for session creation may be transmitted to the SMF 303 through an SGW (not illustrated). The create session request message transmitted by the MME 302 may include an APN and a subscriber ID (international mobile subscriber identity (IMSI)) of the UE. In step 310, in the case that the MME 302 receives information (e.g., capability indication) indicating whether the UE 300 supports a simultaneous use function of the network slice, the create session request message transmitted by the MME 302 may include information (e.g., capability indication) indicating whether the UE 300 supports a simultaneous use function of the network slice.

In step 314, in order to process a PDN connectivity request message received from the UE 300 through the MME 302, the SMF 303 may receive necessary information such as a policy or subscription information from a specific NF. For example, the SMF 303 may receive a policy from a PCF+PCRF, and also receive subscription information from an UDM+HSS. The policy received by the SMF 303 from the PCF+PCRF or subscription information received from the UDM+HSS may include various information related to network slices. For example, the policy or subscription information received by the SMF 303 may include information (capability indication) indicating whether the UE 300 supports a simultaneous use function of the network slice. Further, for example, the policy or subscription information received by the SMF 303 may include subscribed S-NSSAIs to which the UE 300 subscribes. Further, for example, the policy or subscription information received by the SMF 303 may include S-NSSAI and/or APN (data network name (DNN)) information in which a simultaneous use function of the network slice is required. S-NSSAI information that requires a simultaneous use function of the network slice may mean the above-described SUNS policy (information). Further, for example, the policy or subscription information received by the SMF 303 may include network slice (e.g., S-NSSAI) information associated with another session established by the UE 100.

In step 314, the SMF 303 may determine whether to apply a simultaneous use function of network slices based on at least one of information received from the UE 300, a policy received from the PCF+PCRF, subscription information received from the UDM+HSS, or configuration information stored in the SMF 303. This may be limitedly applied to specific subscribers or may be limitedly applied to specific S-NSSAI or APN.

According to an embodiment, in the case that information received from the UE 300 and/or subscription information received from the UDM+HSS include(s) information (capability indication) indicating that the UE 300 supports a simultaneous use function of the network slice, the SMF 303 may determine to apply a simultaneous use function of the network slice.

According to another embodiment, in the case that information received from the UE 300 and/or subscription information received from the UDM+HSS includes S-NSSAI and/or APN (DNN) information in which a simultaneous use function of the network slice is required, the SMF 303 may determine to apply a simultaneous use function of the network slice.

In step 314, in the case that the SMF 303 determines to apply a simultaneous use function of the network slice, a procedure of step 316 or less is performed. The SMF 303 may call a request service for selecting a network slice (S-NSSAI) for PDN connection establishment to an NF 304 (in this disclosure, referred to as an interworking NF, but the name may be a network slice quota management function or an NSSF, PCF, UDM, UDR, and the like among NFs that have previously provided other functions may include the corresponding function) for network slice interworking management. For example, the SMF 303 may transmit a slice selection request message to an interworking NF 304. Alternatively, the SMF 303 may support a function of the interworking NF described above in the disclosure.

In this case, the request message transmitted by the SMF 303 to the interworking NF 304 may include at least one of one or more S-NSSAI, an ID of a subscriber, or an APN.

One or more S-NSSAIs included in the request message sent by the SMF 303 may be one or more S-NSSAIs that the SMF 303 may support. Alternatively, one or more S-NSSAIs included in the request message sending by the SMF 303 may be S-NSSAIs that may be supported by the SMF 303 among subscribed S-NSSAIs of the UE.

As described above, in the case that a SUNS policy is included in a policy received by the SMF 303 from the PCF+PCRF or subscription information received from the UDM+HSS, the request message sending by the SMF 303 to the interworking NF 304 may include a SUNS policy.

In the case that the policy received by the SMF 303 from the PCF+PCRF or subscription information received from the UDM+HSS includes network slice (e.g., S-NSSAI) information associated with another session established by the UE 100, the request message sending by the SMF 303 to the interworking NF 304 may include network slice (e.g., S-NSSAI) information associated with another session established by the UE.

In step 318, the interworking NF 304 may process the request message received from the SMF 303 in step 316. For example, the interworking NF 304 may determine whether the support for the S-NSSAI requested by the SMF 303 is possible, and select one or more S-NSSAI.

In the interworking NF 304 according to an embodiment of the disclosure, a SUNS policy for such determination may be preconfigured. Alternatively, the interworking NF 304 may receive the SUNS policy from the SMF 303.

Further, the interworking NF 304 according to an embodiment of the disclosure may receive and/or manage S-NSSAI information associated with a session (PDU session or PDN connection) established by the UE. For example, the interworking NF 304 may store and manage S-NSSAI information associated with a session (PDU session or PDN connection) established by the UE.

According to another example, S-NSSAI information associated with a session (PDU session or PDN connection) established by the UE may be stored in a separate NF or storage 305 (e.g., UDM or UDR). In this case, a procedure for the interworking NF 304 to receive information from the separate NF or storage 305 is described in steps 320 to 322.

According to another example, the interworking NF 304 may receive S-NSSAI information associated with a session (PDU session or PDN connection) established by the UE from the SMF 303.

The interworking NF 304 according to an embodiment of the disclosure may select S-NSSAI based on a SUNS policy and S-NSSAI information of a session established by the UE.

For example, in the case that S-NSSAI A and S-NSSAI C is available simultaneously (e.g., in the case that the S-NSSAI A and the S-NSSAI C is associated with the same group) and that the S-NSSAI A and the S-NSSAI B is unavailable simultaneously (e.g., in the case that the S-NSSAI A and the S-NSSAI B is associated with different groups, respectively) and that another session established by the UE 300 is associated with the S-NSSAI A, and that the SMF 303 may support the S-NSSAI B and the S-NSSAI C, the interworking NF 304 may select the S-NSSAI C available simultaneously with the S-NSSAI A.

In the case that there is no S-NSSAI that may be selected based on the SUNS policy and the S-NSSAI information of the session established by the UE, the interworking NF 304 may not select the S-NSSAI or may select default S-NSSAI.

For example, in the case that the S-NSSAI A and the S-NSSAI C is available simultaneously (e.g., in the case that the S-NSSAI A and the S-NSSAI C is associated with the same group) and that the S-NSSAI A and the S-NSSAI B is unavailable simultaneously (e.g., in the case that the S-NSSAI A and the S-NSSAI B is associated with different groups, respectively) and that another session established by the UE 300 is associated with the S-NSSAI A, and that the SMF 303 may support the S-NSSAI B, the S-NSSAI B supported by the SMF 303 is unavailable simultaneously with the S-NSSAI A; thus, the interworking NF 304 may select no S-NSSAI or select default S-NSSAI.

In this case, the selected default S-NSSAI may be default S-NSSAI belonging to the same group as that of S-NSSAI A associated with another session established by the UE.

In steps 320 and 322, in the case that slice related state information (S-NSSAI information associated with a session established by the UE) is stored in the separate NF or storage 305, the interworking NF 304 may transmit a request message for acquiring status information to the NF 305 that provides the corresponding function, and the message may include a subscriber ID of the UE. The NF 305 may transmit slice information (S-NSSAI) associated with the session established by the UE referred to as a subscriber ID to the interworking NF 304.

According to an embodiment, in the case that the NF 305 providing the above-described storage function is UDM, the interworking NF 304 may transmit a request message to the UDM. If necessary, the UDM may store slice related state information (S-NSSAI information associated with a session established by the UE) in the UDR. According to another embodiment, in the case that the NF 305 providing the storage function is UDR, the interworking NF 304 may transmit a request message to the UDR, which may be transmitted to the UDR through the UDM.

In step 324, the interworking NF 304 may transmit slice information (i.e., S-NSSAI) selected in step 318 to the SMF 303.

In step 318, in the case that there are a plurality of S-NSSAIs that may be selected based on the SUNS policy and the S-NSSAI information of the session established by the UE, the interworking NF 304 may include the plurality of S-NSSAIs in a response message. Alternatively, the interworking NF 304 may include one S-NSSAI selected according to any criterion among a plurality of S-NSSAIs in the response message.

In step 318, in the case that S-NSSAI is not selected based on the SUNS policy and the S-NSSAI information of the session established by the UE, the interworking NF 304 may not include any S-NSSAI in the response message. Further, the interworking NF 304 may include an error message (reject message, error cause, and the like) indicating that S-NSSAI selection has failed in the response message.

In step 326, the SMF 303 may finally determine S-NSSAI to be transmitted to the UE based on information received from the interworking NF 304 in step 324. In the case that the message received in step 324 includes a plurality of S-NSSAIs, the SMF 303 may select one S-NSSAI among the plurality of received S-NSSAIs according to any criterion. For example, the SMF 303 may select one S-NSSAI that may be supported by the SMF 303 among the plurality of received S-NSSAIs.

In step 324, in the case that no S-NSSAI has been received or that information indicating that S-NSSAI selection has failed has been received, or that there is no S-NSSAI supportable by the SMF 303 among the plurality of received S-NSSAIs, the SMF 303 may determine that there is no selectable S-NSSAI. Accordingly, the SMF 303 may determine to reject the session request. In this case, the response message transmitted in steps 328 to 330 may be a reject message. Alternatively, the SMF 303 may select arbitrary S-NSSAI (e.g., default S-NSSAI, S-NSSAI supported by the SMF, and the like). In step 328, the SMF 303 transmits a create session response message to the MME 302, and in this case, the SMF 303 includes the selected S-NSSAI in protocol configuration options (PCO). The message may be transmitted from the SMF 303 to the MME 302 through the SGW.

In step 330, the MME 302 sends an acceptance message indicating that attach or session creation is permitted to the UE 300, and in this case, the MME 302 includes the previously received PCO in the acceptance message and transmits the acceptance message to the UE 300.

The UE 300 finally receives the S-NSSAI, and the information may be used for a registration process and other session processing in the case that the UE 300 moves to 5G in the future. In order to continuously use the session established in the EPC in even 5G, the UE 300 to move to 5G in the future may transmit requested NSSAI including S-NSSAI associated with the session established in the EPC to the AMF of 5G. According to an embodiment of the disclosure, because S-NSSAI associated with the session established by the EPC is composed of simultaneously available network slices, S-NSSAI included in the requested NSSAI may be composed of simultaneously available network slices.

According to another embodiment of the disclosure, the mobile communication operator may determine not to apply the slice simultaneous use policy (SUNS) in the case that the UE accesses the EPC according to the mobile communication operator policy. The UDM according to the embodiment of the disclosure may determine whether to apply the slice simultaneous use policy (i.e., SUNS policy) according to when the UE subscription information request message is created, received, or generated or from which NF the UE subscription information request message is created, received, or generated. For example, in the case that the UE subscription information request message is created, received, or generated during the 5G registration procedure, the UDM may determine to apply the simultaneous use policy (i.e., the SUNS policy). Alternatively, in the case that the UE subscription information request message is created, received, or generated during the EPC PDN connection establishment procedure, the UDM may determine not to apply the simultaneous use policy (i.e., the SUNS policy). Such a determination may be determined based on at least one of NF information (e.g., NF ID and NF type) for sending a UE subscription information request message, definitions of different types of request messages, or an indicator included in the request message.

In the case that it is determined not to apply the simultaneous use policy (i.e., the SUNS policy), the subscription information received by the SMF from the UDM in step 314 may not include SUNS information. Further, the UDM may determine subscribed S-NSSAI according to the operator policy.

According to an embodiment, subscribed S-NSSAIs transmitted by the UDM to the SMF may include only S-NSSAIs belonging to the same group. For example, the UDM may determine S-NSSAI associated with a group to which default S-NSSAI belongs to subscribed S-NSSAIs and transmit it to the SMF. In this case, all S-NSSAI associated with all PDN connections established by the UE in the EPC may belong to the same group.

According to another embodiment, subscribed S-NSSAIs transmitted by the UDM to the SMF may include S-NSSAIs belonging to different groups. In this case, S-NSSAI associated with the PDN connection established by the UE in the EPC may belong to different groups.

Figure 4:
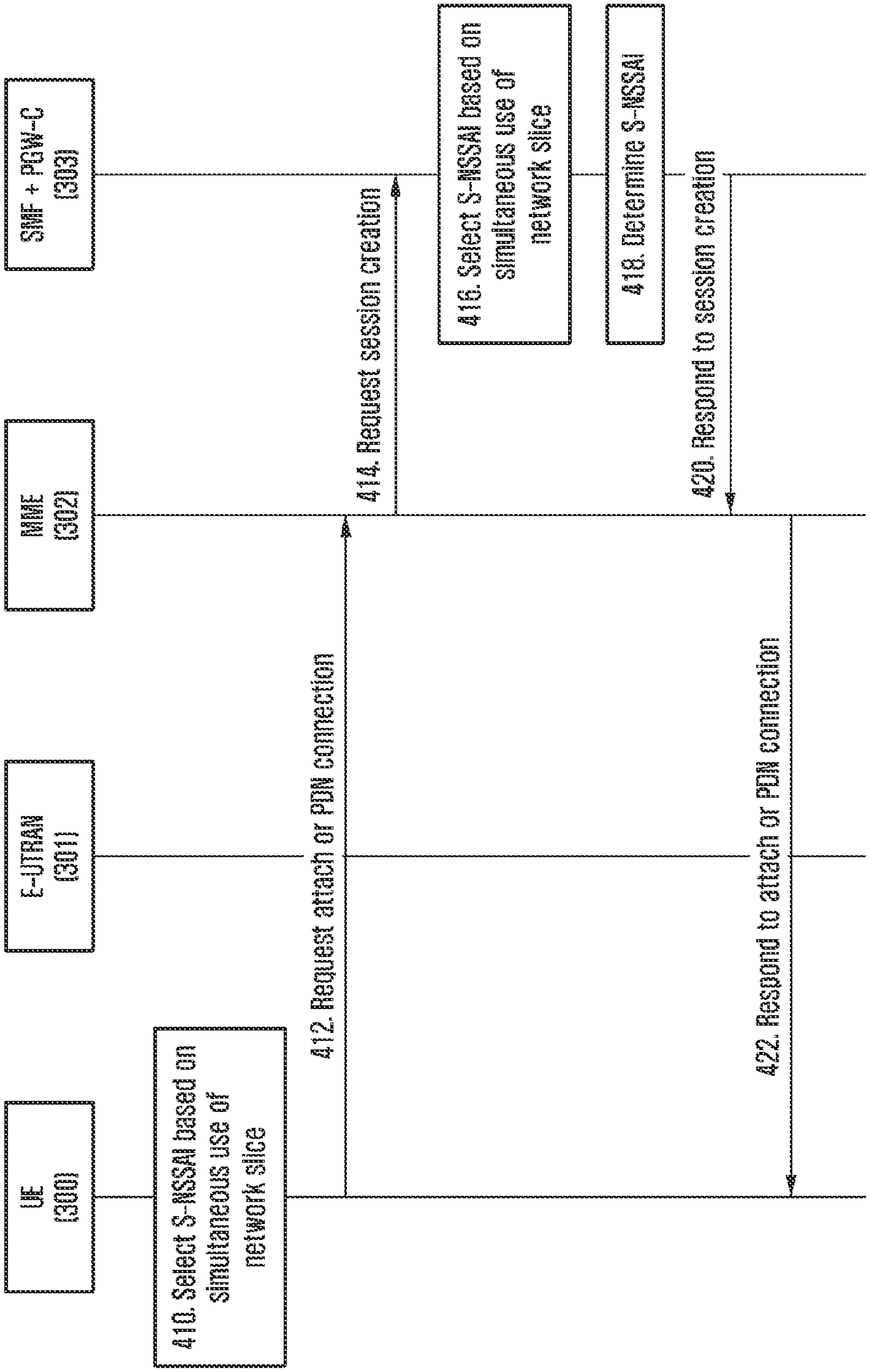
FIG. 4 is a message flow diagram illustrating a network slice selection method according to an embodiment of the disclosure.

FIG. 4 is a diagram illustrating a network slice selection method according to an embodiment of the disclosure.

FIG. 4 illustrates a session connection procedure in an EPC according to an embodiment of the disclosure.

A UE operation according to an embodiment of the disclosure for providing simultaneous usability of a network slice among the session connection procedure illustrated in FIG. 4 will be described.

With reference to FIG. 4, the UE 300 may access the MME 302 of the EPS through the E-UTRA base station 301 to establish a PDN connection and use an EPS network service.

In step 410, a SUNS policy may be preconfigured in the UE 300 according to an embodiment of the disclosure. For example, the UE 300 may receive and store the SUNS policy from the NF (AMF, PCF, UDM, and the like). The SUNS policy may be information included in a UE policy (e.g., UE route selection policy (URSP)) or configured NSSAI. Alternatively, the SUNS policy may be information independent of the URSP or configured NSSAI.

Further, the UE 300 according to an embodiment of the disclosure may manage S-NSSAI information associated with a session (PDU session, PDN connection) established by the UE.

The UE 300 according to an embodiment of the disclosure may select S-NSSAI of a session to be newly established based on the SUNS policy and S-NSSAI information of the session established by the UE.

For example, the UE 300 may determine that a session to be newly established may be provided through S-NSSAI B or S-NSSAI C based on the UE policy (e.g., URSP). In this case, in the case that S-NSSAI A, S-NSSAI B, and S-NSSAI C is included in configured NSSAI stored by the UE 300, and that the S-NSSAI A and the S-NSSAI C is available simultaneously, and that the S-NSSAI A and the S-NSSAI B is unavailable simultaneously, and that another session established by the UE 300 is associated with the S-NSSAI A, the UE 300 may select the S-NSSAI C available simultaneously with the S-NSSAI A.

In the case that there is no S-NSSAI that may be selected based on the SUNS policy and S-NSSAI information of the session established by the UE, the UE 300 may not select the S-NSSAI or may select default S-NSSAI.

For example, the UE 300 may determine that a session to be newly established may be provided through the S-NSSAI B based on the UE policy (e.g., URSP). In this case, in the case that the S-NSSAI A and the S-NSSAI B is included in configured NSSAI stored by the UE 300 and that the S-NSSAI A and the S-NSSAI B is unavailable simultaneously, and that another session established by the UE 300 is associated with the S-NSSAI A, the S-NSSAI A and the S-NSSAI B is unavailable simultaneously; thus, the UE 300 may not select any S-NSSAI or may select default S-NSSAI.

In step 412, after the UE 300 accesses the 4G wireless network (E-UTRAN or eNB) 301, in the case that the UE 300 is in an attach process for receiving a 4G service or has been already registered in a 4G service, the UE 300 performs a process of creating a PDN connection. The UE 300 may merge and perform an operation for establishing a PDN connection during the attach process. The UE 300 may include a desired APN in a NAS request message sending to the MME 302 in order to identify a service to be a target of session creation, and include S-NSSAI selected by the UE 300 in step 410 together with the APN. Further, the UE 300 may include information (capability indication) indicating whether the UE supports a simultaneous use function of the network slice in the NAS request message sending to the MME 302.

In step 414, the MME 302 performs a process for creating a session according to information received from the UE 300. The MME 302 selects a GW (e.g., SGW, PGW) to process the session in consideration of the APN and other parameters, and the MME 302 transmits a request message for session creation to SMF+PGW-C (for convenience of description, hereinafter, referred to as an SMF) 304. In this case, the session creation request message transmitted by the MME 302 may be transmitted to the SMF 304 through a SGW (not illustrated). The create session request message transmitted by the MME 302 may include an APN and a subscriber ID (IMSI) of the UE.

In the case that the UE 300 receives information (e.g., capability indication information) indicating whether the UE supports a simultaneous use function of the network slice of the UE 300 and/or S-NSSAI selected by the UE in step 412, the create session request message transmitted by the MME 302 may include S-NSSAI selected by the UE, information (e.g., capability indication information) indicating whether the UE 300 supports a simultaneous use function of the network slice, and the like.

In step 416, in order to process the PDN connectivity request message received from the UE 300 through the MME 302, the SMF 303 may receive necessary information such as a policy or subscription information from a specific NF. For example, the SMF 303 may receive a policy from the PCF+PCRF, and also receive subscription information from the UDM+HSS. The policy received by the SMF 303 from the PCF+PCRF or subscription information received from the UDM+HSS may include various information related to network slices. For example, the policy or subscription information received by the SMF 303 may include information (capability indication) indicating whether the UE 300 supports a simultaneous use function of the network slice. Further, for example, the policy or subscription information received by the SMF 303 may include subscribed S-NSSAIs to which the UE 300 subscribes. Further, for example, the policy or subscription information received by the SMF 303 may include S-NSSAI and/or APN (DNN) information in which a simultaneous use function of a network slice is required. S-NSSAI information in which the simultaneous use function of the network slice is required may mean a SUNS policy (or SUNS information).

In step 416, the SMF 303 may determine whether to apply a simultaneous use function of network slices based on at least one of information received from the UE 300, a policy received from the PCF+PCRF, subscription information received from the UDM+HSS, or configuration information stored in the SMF 303. This may be limitedly applied to specific subscribers, or may be limitedly applied to specific S-NSSAI or APN.

According to an embodiment, in the case that information received from the UE 300 and/or subscription information received from the UDM+HSS include(s) information (capability indication) indicating that the UE 300 supports a simultaneous use function of the network slice, the SMF 303 may determine to apply the simultaneous use function of the network slice.

According to another embodiment, in the case that information received from the UE 300 and/or subscription information received from the UDM+HSS includes S-NSSAI and/or APN (DNN) information in which the simultaneous use function of network slice is required, the SMF 303 may determine to apply the simultaneous use function of the network slice.

In step 418, the SMF 303 may finally determine S-NSSAI to be transmitted to the UE based on information received from the UE 300, subscription information received from the UDM, and configuration information stored in the SMF 303.

The SMF 303 may identify whether S-NSSAI received from the UE 300 is included in subscribed S-NSSAIs received from the UDM. Further, the SMF 303 may identify whether S-NSSAI received from the UE 300 is S-NSSAI that may be supported by the SMF 303.

In the case that S-NSSAI received from the UE 300 is included in subscription information received from the UDM and that the SMF 303 is supportable S-NSSAI, the SMF 303 may determine to use S-NSSAI received from the UE 300.

In the case that the S-NSSAI received from the UE 300 is not included in the subscription information received from the UDM or that the SMF 303 is not supportable S-NSSAI, the SMF 303 may determine not to use the S-NSSAI received from the UE 300. Accordingly, the SMF 303 may determine to reject the session request. In this case, the response message transmitted in steps 420 to 422 may be a reject message. Alternatively, the SMF 303 may select arbitrary S-NSSAI (e.g., default S-NSSAI, and S-NSSAI that may be supported by the SMF).

In step 420, the SMF 303 transmits the create session response to the MME 302, and in this case, the S-NSSAI selected by the SMF 303 is included in the PCO. Such a message transmitted by the SMF 303 may be transmitted to the MME 302 through the SGW.

In step 422, the MME 302 sends, to the UE, an acceptance message notifying that attach or session creation was permitted, and in this case, the MME 302 includes the previously received PCO in the acceptance message and transmits the acceptance message.

The UE 300 may finally receive S-NSSAI, and this information may be used for a registration process and other session processing in the case that the UE 300 moves to 5G in the future. In order to continuously use the session established in the EPC in even 5G, the UE 300 to move to 5G in the future may transmit requested NSSAI including S-NSSAI associated with the session established in the EPC to the AMF of 5G. According to an embodiment of the disclosure, because S-NSSAI associated with the session established by the EPC is composed of simultaneously available network slices, S-NSSAI included in the requested NSSAI may be composed of simultaneously available network slices.

Figure 5:
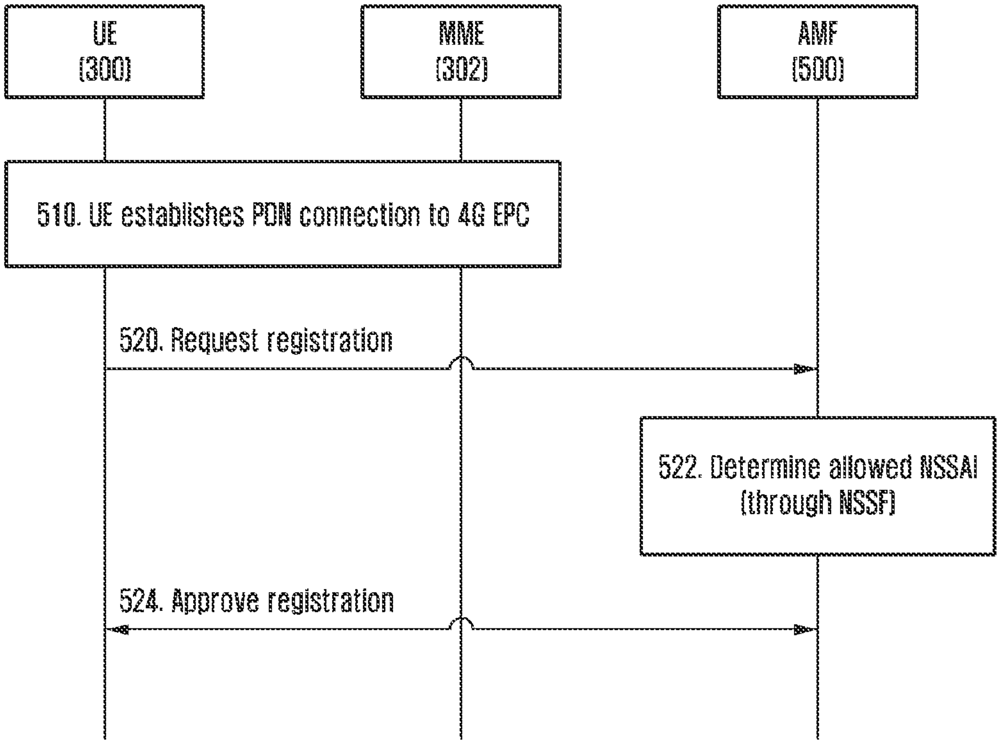
FIG. 5 is a message flow diagram illustrating a network slice management method according to an embodiment of the disclosure.

FIG. 5 is a message flow diagram illustrating a network slice management method according to an embodiment of the disclosure. FIG. 5 illustrates a procedure for moving from an EPC to a 5GC according to an embodiment of the disclosure.

In FIG. 5, an NF operation according to an embodiment of the disclosure for providing simultaneous usability of network slices during a registration procedure is described.

With reference to the embodiment of FIG. 5, the UE 300 may continuously use a session established in the EPC after moving the session to the 5GC.

In step 510, the UE 300 may create a PDN connection after accessing 4G to use a service. In this case, one session (i.e., PDN connection) may be associated with one slice ID (S-NSSAI), and the UE 300 may store a slice ID (S-NSSAI) associated with each session (i.e., PDN connection). For example, a first session established by the UE in the EPC may be associated with a first slice ID, and a second session may be associated with a second Slice ID.

In step 520, the UE 300 that has moved to a 5GC may transmit a registration request message to the AMF 500 in order to access 5G. The registration request message may include requested NSSAI. In this case, the requested NSSAI included in the registration request message transmitted by the UE may include a slice ID associated with a PDN connection established by the UE 300 in the EPC. For example, the requested NSSAI may include a first slice ID and a second slice ID.

According to an embodiment of the disclosure, a SUNS policy may be preconfigured in the UE 300. For example, the UE 300 may receive and store a SUNS policy from the NF (AMF, PCF, UDM, and the like). The SUNS policy may be information included in a UE policy (e.g., UE route selection policy (URSP)) or configured NSSAI. Alternatively, the SUNS policy may be information independent of the URSP or configured NSSAI. In the case that SUNS information is configured in the UE 300, the UE 300 may constitute requested NSSAI based on the SUNS information. For example, in the case that a first slice ID associated with a first session established by the UE in the EPC and a second slice ID associated with a second session belong to the same group, the UE 300 may include a first slice ID and a second slice ID in the requested NSSAI. Alternatively, in the case that the first slice ID associated with the first session established by the UE in the EPC and the second slice ID associated with the second session belong to different groups, the UE 300 may include only one slice ID among the first slice ID and the second slice ID in the requested NSSAI.

According to an embodiment of the disclosure, the SUNS policy may not be preconfigured in the UE 300. For example, in the case that the UE 300 has not previously accessed (or registered) the 5G network, the SUNS policy may not be preconfigured in the UE 300. In the case that SUNS information is not configured in the UE 300, the UE 300 may constitute requested NSSAI based on priority information for each slice. For example, the UE 300 may determine a slice priority between the first slice ID associated with the first session established in the EPC and the second slice ID associated with the second session. The UE 300 may include a first slice ID, a second slice ID, and priority information of each slice ID in the requested NSSAI. For example, the UE 300 may constitute the order of slice IDs included in the requested NSSAI according to the priority. In step 522, the AMF 500 may determine an allowed slice (allowed NSSAI) that the UE 300 may use by accessing 5G in consideration of the simultaneously available network slice policy. Further, the AMF 500 may determine allowed NSSAI through an NSSF (not illustrated) during this process.

A SUNS policy may be configured in the AMF 500 or the NSSF according to an embodiment of the disclosure. Alternatively, the AMF or the NSSF may receive a SUNS policy from another NF (e.g., PCF, UDM, and AMF).

The AMF 500 according to an embodiment of the disclosure may acquire PDN connection information (including S-NSSAI information associated with the PDN connection) established by the UE in the EPC from another NF (e.g., MME, SMF, and UDM).

The AMF 500 or the NSSF according to an embodiment of the disclosure may determine allowed NSSAI based on at least one of requested NSSAI, a SUNS policy, PDN connection information established by the UE in the EPC, UE subscription information, a slice priority, or S-NSSAI information that may be supported by the SMF.

According to an embodiment, the AMF 500 or the NSSF may determine whether a first slice ID and a second slice ID included in requested NSSAI are simultaneously available network slices based on the SUNS policy.

In the case that a first slice ID and a second slice ID are simultaneously available network slices, the AMF or the NSSF may include the first slice ID and the second slice ID in the allowed NSSAI.

In the case that a first slice ID and a second slice ID are not simultaneously available network slices, the AMF or the NSSF may include only one slice ID among the first slice ID and the second slice ID in the allowed NSSAI. When the AMF or the NSSF determines the allowed NSSAI, a slice priority may be considered. For example, the AMF or the NSSF may determine to include a slice having a high priority among simultaneously unavailable network slices in the allowed NSSAI. In this case, the slice priority may be determined based on a network policy and/or information transmitted by the UE (e.g., the order of slice IDs included in the requested NSSAI). According to another embodiment, in the case that a first slice ID and a second slice ID are not simultaneously available network slices, the AMF or the NSSF may perform the slice change.

For example, the AMF or the NSSF may determine to change the second slice ID to a third slice ID available simultaneously with the first slice ID. In this case, the third slice ID may be a slice available simultaneously with the first slice ID among subscribed S-NSSAIs. Further, the third slice ID may be a slice served by the SMF serving the second session.

According to another embodiment, when the AMF or the NSSF performs a slice change, a slice priority may be considered. For example, the AMF or the NSSF may determine to first change a slice having a lower priority among simultaneously unavailable network slices. In this case, the slice priority may be determined based on a network policy and/or information transmitted by the UE (e.g., the order of slice IDs included in the requested NSSAI). In this case, the AMF or the NSSF may include the first slice ID and the third slice ID (a replaced slice ID instead of the second slice ID) in the allowed NSSAI.

In step 524, the AMF 500 may transmit a registration accept message to the UE 300. The registration accept message may include the allowed NSSAI determined in step 522. In the case that the slice change is performed in step 522, the AMF 500 may include information notifying that the slice change has occurred in the registration accept message.

The UE 300 finally receives S-NSSAI included in the allowed NSSAI, and in the case that the slice ID is replaced, the UE 300 may update session information according to such replacement.

The following description illustrates an example of a constitution of requested NSSAI and allowed NSSAI according to an embodiment of the disclosure. For description, it is assumed that the second slice ID associated with the second session is replaced with the third slice ID.

Requested NSSAI: {(first slice ID, –), (second slice ID, –)}

The first slice ID and the second slice ID included in the requested NSSAI are an SST 112 and SD (optional) 114, respectively, of the serving PLMN illustrated in FIG. 1.

Allowed NSSAI: {(first slice ID, –), (third slice ID, second slice ID)}

The first slice ID and the third slice ID included in the allowed NSSAI are the SST 112 of the serving PLMN illustrated in FIG. 1 and the SD (optional) 114 of the serving PLMN. Further, the second slice ID is the mapped SST 116 and the mapped SD 118 (optional) illustrated in FIG. 2.

According to an embodiment of the disclosure, the UE 300 that transmits requested NSSAI and receives allowed NSSAI may identify that the SST 112 of the serving PLMN and the SD (optional) 114 of the serving PLMN are included in the allowed NSSAI without changing the first slice ID associated with the first session and know that there is no change in S-NSSAI associated with the first session.

Further, the UE 300 may identify that the second slice ID associated with the second session was included as the mapped SST 116 and the mapped SD (optional) 118 in the allowed NSSAI, and that a slice mapped to the second slice ID is a third slice ID and know that S-NSSAI associated with the second session was changed from the second slice ID to the third slice ID. In this case, the UE 300 may evaluate or re-evaluate whether a service/application using the second session may use the third slice ID based on the URSP stored therein. In the case that the second session may use the third slice ID, the UE 300 may update S-NSSAI information associated with the second session to the third slice ID. In the case that the second session cannot use the third slice ID, the UE 300 may request release of the second session connection.

In the case that there is S-NSSAI included in the requested NSSAI requested by the UE 300, but not included in the allowed NSSAI received by the UE 300, the UE 300 may know that the S-NSSAI is no longer available. Accordingly, the UE 300 may release or terminate the PDU session (or PDN connection) associated with the corresponding S-NSSAI.

The above-described embodiments may be performed in combination with each other. For example, some or all of a specific embodiment may be performed in a manner combined with some or all of other embodiments, and it is apparent that such a combined form is also included in the scope of the disclosure.

Figure 6:
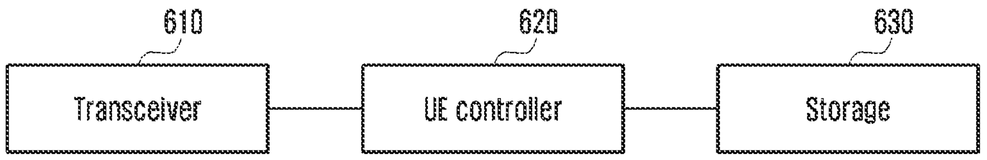
FIG. 6 is a block diagram illustrating a structure of a terminal related to an embodiment of the disclosure.

FIG. 6 is a diagram illustrating a structure of a UE related to an embodiment of the disclosure. With reference to FIG. 6, the UE may include a transceiver 610, a UE controller 620, and a storage 630. In the disclosure, the UE controller 820 may be defined as a circuit, an application specific integrated circuit, or at least one processor.

The transceiver 610 may transmit and receive signals to and from a base station, another UE, and a network entity. The transceiver may, for example, receive system information transmitted from a base station, or transmit and receive data based on a synchronization signal, a reference signal, and/or control information.

The UE controller 620 may control the overall operation of the UE according to the embodiment proposed in the disclosure. For example, the UE controller 620 may control a signal flow between blocks so as to perform an operation according to the above-described drawings and message flow diagrams. Specifically, the UE controller 620 may operate according to a control signal from the base station and send and receive messages or signals to and from the base station, another UE, and/or a network entity.

The storage 630 may store at least one of information transmitted and received through the transceiver 610 or information generated through the UE controller 620.

Figure 7:
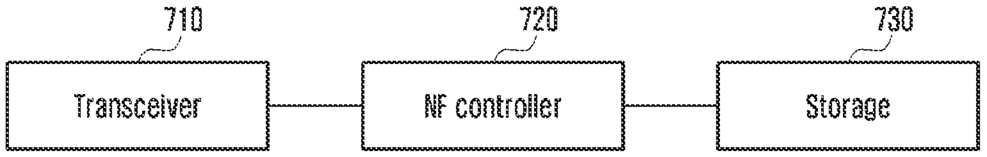
FIG. 7 is a block diagram illustrating a structure of a network function (NF) related to an embodiment of the disclosure.

FIG. 7 is a diagram illustrating a structure of a network function (NF) related to an embodiment of the disclosure. The NF of FIG. 7 may include an NF instance.

The NF illustrated in FIG. 7 may mean at least one of an entity supporting various network functions described above, for example, a mobility management entity (MME), access and mobility function (AMF), session management function (SMF), interworking NF, user data management (UDM), user data repository (UDR), or policy control function (PCF), and is not limited to a specific NF. Further, the NF may be provided in the form of an instance, and in the case that the NF is provided as an instance, the NF exists in the form of a software code, and it may mean an executable state by receiving allocation of physical and/or logical resources from the computing system in order to perform a function of the NF in a physical computing system, for example, in a specific computing system existing on a core network; thus, the structure of FIG. 7 may mean physical division or logical division.

With reference to FIG. 7, the NF may include a transceiver 710, an NF controller 720, and a storage 730.

The transceiver 710 may transmit and receive signals to and from other network entities. The transceiver may send and receive signaling for transmission and reception of control information and data to, for example, another network entity (NF) or a base station.

The NF controller 720 may control the overall operation of the NF according to the embodiment proposed in the disclosure. For example, the NF controller 720 may control a signal flow between blocks so as to perform an operation according to the above-described drawings and message flow diagrams. Specifically, the NF controller 720 may operate according to signaling received from another network entity or base station, and send and receive messages or signals to and from the UE, the base station, and/or another network entity.

The storage 730 may store at least one of information transmitted and received through the transceiver 710 or information generated through the NF controller 720.

Figure 8:
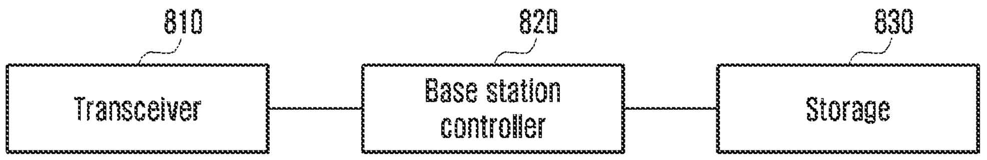
FIG. 8 is a block diagram illustrating a structure of a base station related to an embodiment of the disclosure.

FIG. 8 is a diagram illustrating a structure of a base station related to an embodiment of the disclosure.

With reference to FIG. 8, the base station may include a transceiver 810, a base station controller 820, and a storage 830. In the disclosure, the base station controller 820 may be defined as a circuit, an application specific integrated circuit, or at least one processor.

The transceiver 810 may transmit and receive a signal to and from a UE and a network entity.

The transceiver may transmit, for example, system information, a synchronization signal or a reference signal, or control information and data to the UE, and send and receive messages and signaling for providing a service to the network entity and the UE.

The base station controller 820 may control the overall operation of the base station according to the embodiment proposed in the disclosure. For example, the base station controller may control a signal flow between blocks so as to perform an operation according to the above-described drawings and message flow diagrams. Specifically, the base station controller may send and receive messages or signals to and from the UE and/or the network entity.

The storage 830 may store at least one of information transmitted and received through the transceiver 810 or information generated through the base station controller 820.

The embodiments disclosed in this specification and drawings only present specific examples to easily describe the contents of the disclosure and to help understanding, and they are not intended to limit the scope of the disclosure. Therefore, in addition to the embodiments disclosed herein, all changes or modifications derived from the disclosure should be construed as being included in the scope of the disclosure.

The invention claimed is:

1. A method performed by an access and mobility function (AMF) entity in a wireless communication system, the method comprising:
- receiving, from a user equipment (UE), a registration request message including first information on a requested network slice, wherein the first information indicates at least one network slice related to a packet data network (PDN) connection established in a first network;
- determining an allowed network slice available in a second network, based on the first information and a simultaneous use of a network slice (SUNS) policy; and
- transmitting, to the UE, a registration accept message including second information indicating the allowed network slice,
- wherein determining the allowed network slice comprises determining, by the AMF entity, the allowed network slice indicated by the second information by:
  - including a second network slice which is available to be used simultaneously with a first network slice among the at least one network slice;
  - excluding a third network slice which is unavailable to be used simultaneously with the first network slice among the at least one network slice; or
  - including a default network slice, if there is no network slice to be selected based on the first information and the SUNS policy.

2. The method of claim 1, wherein the at least one network slice indicated by the first information is determined based on the SUNS policy or priority information for each network slice, and
- wherein the SUNS policy is stored in a user data management (UDM) entity.

3. A method performed by a user equipment (UE) in a wireless communication system, the method comprising:
- transmitting, to an access and mobility function (AMF) entity, a registration request message including first information on a requested network slice, wherein the first information indicates at least one network slice related to a packet data network (PDN) connection established in a first network; and
- receiving, from the AMF, a registration accept message including second information indicating an allowed network slice available in a second network,
- wherein the allowed network slice available in the second network is based on the first information and a simultaneous use of a network slice (SUNS) policy,
- wherein the allowed network slice indicated by the second information is determined, by the AMF entity, by:

including a second network slice which is available to be used simultaneously with a first network slice among the at least one network slice;

excluding a third network slice which is unavailable to be used simultaneously with the first network slice among the at least one network slice; or including a default network slice, if there is no network slice to be selected based on the first information and the SUNS policy.

4. The method of claim 3, wherein the at least one network slice indicated by the first information is determined based on the SUNS policy or priority information for each network slice, and wherein the SUNS policy is stored in a user data management (UDM) entity.

5. An access and mobility function (AMF) entity of a wireless communication system, the AMF entity comprising:

a transceiver configured to transmit and receive signals; and a controller, wherein the controller is configured to:

receive, from a user equipment (UE), a registration request message including first information on a requested network slice, wherein the first information indicates at least one network slice related to a packet data network (PDN) connection established in a first network, determine an allowed network slice available in a second network, based on the first information and a simultaneous use of a network slice (SUNS) policy, and transmit, to the UE, a registration accept message including second information indicating the allowed network slice, wherein determining the allowed network slice comprises determining, by the AMF entity, the allowed network slice indicated by the second information by:

including a second network slice which is available to be used simultaneously with a first network slice among the at least one network slice;

excluding a third network slice which is unavailable to be used simultaneously with the first network slice among the at least one network slice; or including a default network slice, if there is no network slice to be selected based on the first information and the SUNS policy.

6. The AMF entity of claim 5, wherein the at least one network slice indicated by the first information is determined based on the SUNS policy or priority information for each network slice, and wherein the SUNS policy is stored in a user data management (UDM) entity.

7. The AMF entity of claim 5, wherein the controller is further configured to acquire UE capability information indicating whether the UE supports the SUNS policy.

8. A user equipment (UE) of a wireless communication system, the UE comprising:

a transceiver configured to transmit and receive signals; and a controller, wherein the controller is configured to:

transmit, to an access and mobility function (AMF) entity, a registration request message including first information on a requested network slice, wherein the first information indicates at least one network slice related to a packet data network (PDN) connection established in a first network, and receive, from the AMF, a registration accept message including second information indicating an allowed network slice available in a second network, wherein the allowed network slice available in the second network is based on the first information and a simultaneous use of a network slice (SUNS) policy, wherein the allowed network slice indicated by the second information is determined, by the AMF entity, by:

including a second network slice which is available to be used simultaneously with a first network slice among the at least one network slice;

excluding a third network slice which is unavailable to be used simultaneously with the first network slice among the at least one network slice; or including a default network slice, if there is no network slice to be selected based on the first information and the SUNS policy.

9. The UE of claim 8, wherein the at least one network slice indicated by the first information is determined based on the SUNS policy or priority information for each network slice, and wherein the SUNS policy is stored in a user data management (UDM) entity.

10. The method of claim 1, further comprising acquiring UE capability information indicating whether the UE supports the SUNS policy.

* * * * *